United States Patent
Matsuda et al.

(10) Patent No.: US 8,785,062 B2
(45) Date of Patent: Jul. 22, 2014

(54) FUEL CELL SYSTEM COMPRISING FUEL CELL STACK, AND METHOD FOR PRODUCING FUEL CELL STACK

(75) Inventors: Hiroaki Matsuda, Osaka (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 497 days.

(21) Appl. No.: 12/616,488

(22) Filed: Nov. 11, 2009

(65) Prior Publication Data
US 2010/0124681 A1 May 20, 2010

(30) Foreign Application Priority Data
Nov. 14, 2008 (JP) .................................. 2008-291861

(51) Int. Cl.
H01M 8/06 (2006.01)
H01M 8/04 (2006.01)

(52) U.S. Cl.
CPC ............ *H01M 8/04007* (2013.01); *Y02E 60/50* (2013.01); *H01M 8/04828* (2013.01); *Y02E 60/523* (2013.01); *H01M 8/04126* (2013.01); *H01M 8/04492* (2013.01)
USPC ........... 429/413; 429/430; 429/435; 429/436; 429/442; 429/450; 429/512

(58) Field of Classification Search
USPC .......... 429/413, 430, 435, 436, 442, 450, 512
See application file for complete search history.

(56) References Cited

U.S. PATENT DOCUMENTS

| 2006/0263653 A1* | 11/2006 | Sinha et al. ...................... 429/13 |
| 2007/0287041 A1* | 12/2007 | Alp et al. ......................... 429/22 |
| 2008/0081238 A1* | 4/2008 | Becker et al. ................... 429/26 |
| 2008/0102335 A1* | 5/2008 | Skala .............................. 429/26 |

FOREIGN PATENT DOCUMENTS

| JP | 2000-003718 | 1/2000 |
| JP | 2003-217622 A | 7/2003 |
| JP | 2004-146267 A | 5/2004 |
| JP | 2005-294173 | 10/2005 |
| JP | 2005-302360 A | 10/2005 |

OTHER PUBLICATIONS

Definition of "configure": http://dictionary.reference.com/browse/configure, Oct. 17, 2012, p. 2.*

* cited by examiner

*Primary Examiner* — Eugenia Wang
(74) *Attorney, Agent, or Firm* — McDermott Will & Emery LLP

(57) ABSTRACT

The fuel cell system of the present invention includes: (A) a fuel cell stack including at least one unit fuel cell including a cathode, an anode, and a polymer electrolyte membrane interposed therebetween; (B) a detecting device for detecting lack of humidification in the fuel cell stack; (C) a water supplying device for supplying moisture to the fuel cell stack when lack of humidification is detected by the detecting device; (D) a heating device for heating the supplied moisture; and (E) a cooling device for cooling the supplied moisture. In the fuel cell system of the present invention, the fuel cell stack is humidified by repeating heating and cooling of the supplied moisture by the heating device and the cooling device, respectively.

11 Claims, 1 Drawing Sheet

FUEL CELL SYSTEM COMPRISING FUEL CELL STACK, AND METHOD FOR PRODUCING FUEL CELL STACK

FIELD OF THE INVENTION

The present invention mainly relates to a fuel cell system including a fuel cell stack, and particularly relates to a fuel cell system capable of quickly humidifying a fuel cell stack when lacking humidification.

BACKGROUND OF THE INVENTION

Solid polymer electrolyte fuel cells using a polymer electrolyte membrane are anticipated to be practically used soon as the power source for household use and electric cars, or for mobile devices such as cell phones and laptop computers.

A solid polymer electrolyte fuel cell (hereinafter simply referred to as "fuel cell") has at least one unit fuel cell including: a membrane electrode assembly (hereinafter referred to as "MEA"); and a pair of separators each of which is disposed on each side of the MEA. The MEA includes an anode, a cathode, and a polymer electrolyte membrane interposed therebetween. The anode and the cathode each include a catalyst layer and a gas diffusion layer.
The anode is bonded to one face in the thickness direction of the polymer electrolyte membrane, and the cathode is bonded onto the other face in the thickness direction thereof. The pair of separators are disposed so as to sandwich the MEA from both faces thereof in the thickness direction. In the fuel cell, power is generated by supplying fuel such as hydrogen gas to the anode and supplying an oxidant such as air to the cathode.

In the case of using a fuel cell as the power source for use other than in small-size devices such as cellular phones, a fuel cell system is configured, in which a fuel cell is provided together with respective supplying devices for air and fuel, and a controlling device for power generation. In the fuel cell system, a fuel cell stack including a plurality of unit fuel cells is used. The respective supplying devices supply air to the cathode and fuel to the anode. As supplying devices, specifically, blowers, pumps, and the like are used. The controlling device, for example, controls: power generated in the fuel cell stack; temperature of the fuel cell stack; and the supplying and stopping of air and of fuel.

However, there are a number of problems for enabling practical use of a fuel cell.

One problem concerns the control of humidification in the unit fuel cell. If the polymer electrolyte membrane used in the unit fuel cell is not in a humidified state, proton conductivity would degrade drastically. Due to the above, in the case where the polymer electrolyte membrane is in a state of lacking humidification, the output power of the unit fuel cell, and further, the output power of the fuel cell stack would degrade drastically. In addition, if the unit fuel cell or the fuel cell stack is operated when the polymer electrolyte membrane is in a state of lacking humidification, there would be an overvoltage at the electrode, thus causing problems such as a rise in electrode potential and side reactions. It is becoming apparent that such problems promote degradation of the catalyst material and the carbon material in the electrode, the polymer electrolyte membrane, and the like.

Normally, the state of humidification in the unit fuel cell is not sufficient immediately after production of a fuel cell stack including a plurality of unit fuel cells. Therefore, the unit fuel cell needs to be humidified in the post-process. In addition, in cases such as where the fuel cell system is in a hibernating state for a long period of time, moisture contained in the unit fuel cell may gradually dissipate to the outside, thus causing the unit fuel cell to be in a state of lacking humidification. In such a case, normally, a method is used in which power generation is conducted to humidify the unit fuel cell.

In the case where fuel is hydrogen gas, normally, hydrogen gas supplied to the anode and air supplied to the cathode each passes through a humidifier to be humidified. In addition, in the case where fuel is an aqueous methanol solution, moisture of the aqueous methanol solution is directly supplied to the anode. In either case, if fuel is supplied for conducting power generation, moisture would be supplied into the unit fuel cell. In addition, water is produced in the cathode by an electrode reaction caused when power is generated. Due to the above reason, the unit fuel cell is humidified by conducting power generation.

In a method for humidifying a unit fuel cell by conducting power generation, humidification is possible in a relatively short period of time. However, even if the time required for humidification is short, from the aspect of life characteristics of the unit fuel cell, it is not favorable to conduct power generation when the unit fuel cell is in a state of lacking humidification.

As a solution for such a problem, a method can be considered in which a unit fuel cell is humidified without conducting power generation. For example, Japanese Laid-Open Patent Publication 2000-003718 (Document 1) proposes: introducing into the unit fuel cell, water or a weakly acidic aqueous solution with a higher temperature than the operating temperature of the fuel cell stack; cleansing with water or a weakly acidic aqueous solution after alcohol is introduced; and the like. The main object of the technique disclosed in Document 1 is considered to be humidification of a fuel cell stack during the process immediately after production of the fuel cell stack. The technique disclosed in Document 1 also enables humidification of a unit fuel cell after a long period of hibernation.

Japanese Laid-Open Patent Publication 2005-294173 (Document 2) proposes humidifying a unit fuel cell at a temperature of 80° C. to 200° C. with a relative humidity of 50% to 100%. Document 2 does not specifically describe how humidification is conducted, but discloses about warming and humidifying fuel gas within the above ranges.

BRIEF SUMMARY OF THE INVENTION

If the method for humidifying is such as the above, a unit fuel cell can be humidified without conducting power generation. However, in either case, there are other issues. Specifically, there is the issue of the time required for humidification becoming significantly longer in the case power generation is not conducted, compared to the case where power generation is conducted. Normally, an electrode of a unit fuel cell undergoes a water repellent treatment and therefore is highly water-repellent. As in the methods of Documents 1 and 2, even if moisture is supplied from outside of the unit fuel cell, such moisture cannot easily enter inside the electrode due to the high water repellency thereof. Therefore, it would be difficult to quickly humidify a unit fuel cell even at high temperatures, only by steadily supplying moisture without any significant change in condition such as whether or not power generation is conducted.

In addition, humidification is conducted at about 80° C. to 200° C. in the technique disclosed in Document 2. The operating temperature of a fuel cell stack is normally about 50° C. to 80° C., and from the aspect of safety in using products, it is not favorable to humidify at a temperature higher than the above. Further, measures for safety and durability against high temperatures would be necessary, which would be unnecessary at normal operating temperature. Due to the above, there would be disadvantages in making a fuel cell system simple and lightweight, as well as in cost aspects.

In the method disclosed in Document 1 in which humidification is conducted by introducing alcohol, an oxidation reaction of alcohol occurs at the catalyst layer, causing an intermediate such as CO to generate thereon and thus poison the catalyst. It is often the case that Pt with low resistance against such catalyst poisoning is used for the cathode catalyst. In addition, in the case where fuel is hydrogen gas, the anode catalyst is also not highly resistant against catalyst poisoning. In the case where fuel is an aqueous methanol solution, the anode catalyst is highly resistant to alcohol. However, it would be difficult to quickly humidify a unit fuel cell by merely supplying an aqueous methanol solution with low concentration as that used for normal power generation. If an aqueous alcohol solution with high concentration is supplied, degradation can be caused in the electrode, the polymer electrolyte membrane, and the like.

Due to issues such as the above, it is difficult to quickly humidify a unit fuel cell by the respective techniques disclosed in Documents 1 and 2.

It is therefore a primary object of the present invention to provide a fuel cell system capable of quickly humidifying a unit fuel cell in a state of lacking humidification.

In order to solve the above problem, the present inventors concentrated on studying a method for humidifying a unit fuel cell. As a result, they were able to complete the present invention after finding that a unit fuel cell lacking humidification can be quickly humidified by supplying moisture to the unit fuel cell and then repeating heating and cooling of the moisture without conducting power generation.

That is, the present invention relates to a fuel cell system including:

(A) a fuel cell stack including at least one unit fuel cell including a cathode, an anode, and a polymer electrolyte membrane interposed therebetween;

(B) a detecting device for detecting lack of humidification in the fuel cell stack;

(C) a water supplying device for supplying moisture to the fuel cell stack when lack of humidification is detected by the detecting device;

(D) a heating device for heating the supplied moisture; and (E) a cooling device for cooling the supplied moisture, in which the fuel cell stack is humidified by repeating heating and cooling of the supplied moisture by the heating device and the cooling device, respectively.

The present invention also relates to a method for producing a fuel cell stack including the steps of:

(i) producing a fuel cell stack including at least one unit fuel cell including a cathode, an anode, and a polymer electrolyte membrane interposed therebetween;

(ii) supplying moisture to the fuel cell stack; and (iii) humidifying the fuel cell stack by repeating heating and cooling of the supplied moisture.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A fuel cell system of the present invention includes:

(A) a fuel cell stack including at least one unit fuel cell including a cathode, an anode, and a polymer electrolyte membrane interposed therebetween;

(B) a detecting device for detecting lack of humidification in the fuel cell stack;

(C) a water supplying device for supplying moisture to the fuel cell stack when lack of humidification is detected by the detecting device;

(D) a heating device for heating the supplied moisture; and (E) a cooling device for cooling the supplied moisture.

In the fuel cell system of the present invention, the fuel cell stack is humidified by repeating heating and cooling of the supplied moisture by the heating device and the cooling device, respectively.

In the following, the fuel cell system of the present invention will be explained with reference to figures. The fuel cell system of the present invention can employ the same configuration as that of a conventionally-known fuel cell system, with the exception of the detecting device for detecting lack of humidification, the water supplying device, the heating device, and the cooling device as described below.

(Embodiment 1)

Figure 1:
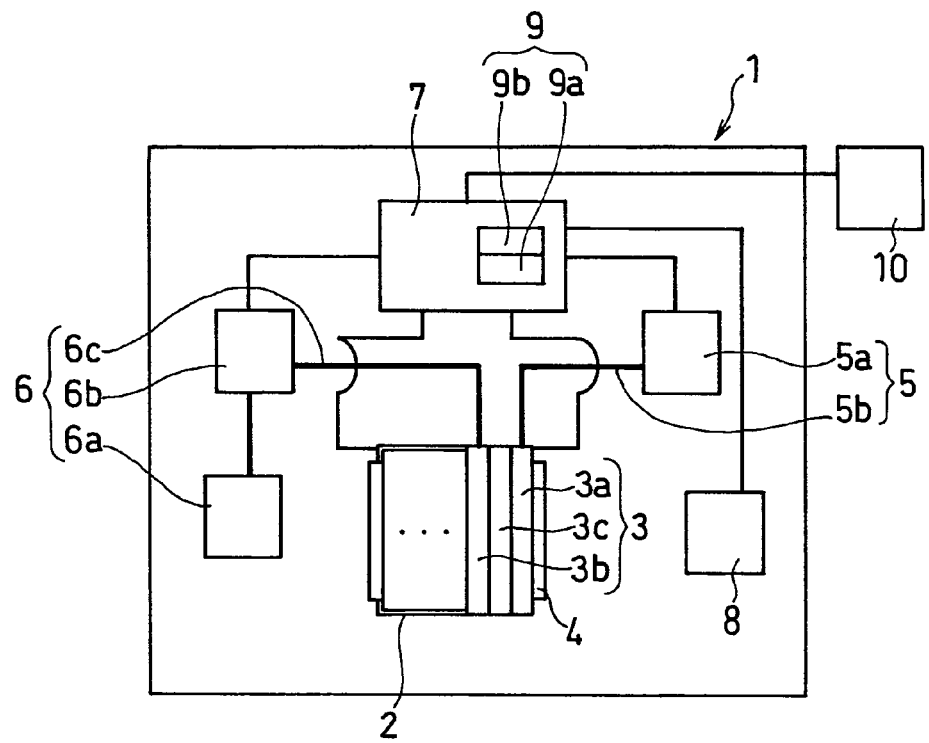
FIG. 1 is a block diagram schematically illustrating the configuration of a fuel cell system according to an embodiment of the present invention.

FIG. 1 illustrates a block diagram of a fuel cell system according to an embodiment of the present invention. A fuel cell system 1 in FIG. 1 uses an aqueous methanol solution as fuel.

The fuel cell system 1 in FIG. 1 includes a fuel cell stack 2, an oxidant supplying device 5, a fuel supplying device 6, a power generation controlling device 7, and a fuel cell stack cooling device 8, which are common components in a direct methanol fuel cell system. The fuel cell stack 2 includes at least one unit fuel cell 3. The fuel cell stack cooling device 8 cools the fuel cell stack 2.

The fuel cell system 1 further includes a heating device 4 and a detecting device 9 for detecting lack of humidification in the fuel cell stack 2. The heating device 4 heats moisture supplied to the fuel cell stack 2. In the present embodiment, the fuel supplying device 6 functions as the water supplying device, and the fuel cell stack cooling device 8 functions as the cooling device for cooling moisture supplied to the fuel cell stack 2. A water supplying device may be provided separately from the fuel supplying device 6.

As above, the fuel cell stack 2 includes at least one unit fuel cell 3. The unit fuel cell 3 includes: a membrane electrode assembly (MEA) including a cathode 3a, an anode 3b, and a polymer electrolyte membrane 3c interposed therebetween; and a pair of separators (that is, a cathode separator and an anode separator) (not illustrated) that sandwich the MEA. In the case where a plurality of unit fuel cells 3 are included in the fuel cell stack 2, the plurality of unit fuel cells 3 are connected, for example, in series. In FIG. 1, only one of the unit fuel cell 3 included in the fuel cell stack 2 is illustrated.

The cathode 3a includes for example, a cathode catalyst layer and a cathode gas diffusion layer (hereinafter referred to as cathode diffusion layer). The cathode catalyst layer is in contact with one face in the thickness direction of the polymer electrolyte membrane 3c. The cathode diffusion layer is in contact with the cathode separator. As the cathode catalyst layer, one normally used in the field of direct methanol fuel cells can be used. The cathode catalyst layer can contain, for example, a cathode catalyst, a conductive material, and a polymer electrolyte. As the cathode catalyst, a material known in the art such as a Pt—Ru alloy can be used. As the conductive material, for example, a carbon material and the like can be used. As the polymer electrolyte, a material conventionally used in the field of fuel cells such as a perfluorosulfonic acid polymer electrolyte and a hydrocarbon polymer electrolyte can be used. In addition, a polymer electrolyte constituting a commercialized polymer electrolyte membrane for fuel cells (for example, Nafion® (manufactured by E.I. du Pont de Nemours and Company)) may be used.

As the cathode diffusion layer, one normally used in the field of fuel cells can be used. For example, a diffusion layer containing a conductive material and the like can be given. As specific examples of the cathode diffusion layer, for example, a carbon non-woven fabric, a carbon paper, a carbon cloth, and the like can be given.

An oxidant is supplied to the cathode 3a. As the oxidant, air is normally used.

The anode 3b includes an anode catalyst layer and an anode gas diffusion layer (hereinafter referred to as anode diffusion layer). The anode catalyst layer is in contact with the other face in the thickness direction of the polymer electrolyte membrane 3c. The anode diffusion layer is in contact with the anode separator. The anode catalyst layer and the anode diffusion layer are constituted in the same manner as the cathode catalyst layer and the cathode diffusion layer.

As the anode catalyst, a material known in the art such as a Pt metal can be used.

An aqueous methanol solution or methanol is supplied as fuel to the anode 3b.

The polymer electrolyte membrane 3c is sandwiched between the cathode 3a and the anode 3b. As the polymer electrolyte membrane 3c, a material normally used in the field of fuel cells can be used. As the polymer electrolyte membrane 3c, a perfluorosulfonic acid polymer electrolyte membrane, a hydrocarbon polymer electrolyte membrane, and the like can be given. In addition, a commercialized polymer electrolyte membrane for fuel cells may be used. As a commercialized product, for example, Nafion® (manufactured by E.I. du Pont de Nemours and Company) and the like can be given.

The cathode separator and the anode separator are in contact with the cathode 3a and the anode 3b, respectively, at the face each thereof opposite of that in contact with the polymer electrolyte membrane 3c. An oxidant channel is formed on the face of the cathode separator in contact with the cathode 3a. A fuel channel is formed on the face of the anode separator in contact with the anode 3b.

A pair each of current collector plates, insulating plates, end plates, and the like may be further stacked on the fuel cell stack 2 in the stacking direction thereof, in a manner sandwiching the fuel cell stack 2.

The oxidant supplying device 5 includes an oxidant delivering device 5a and an oxidant pipe 5b, and supplies an oxidant to the cathode 3a of the unit fuel cell 3 included in the fuel cell stack 2. Specifically, the oxidant delivered by the oxidant delivering device 5a is supplied to the cathode 3a via the oxidant pipe 5b.

As the oxidant delivering device 5a, for example, an air blowing device such as a blower, a pump, and the like can be used. The air blowing device takes in and then delivers air as an oxidant to the oxidant pipe 5b. The oxidant delivering device 5a may be provided with a humidifier (not illustrated).

The oxidant delivering device 5a is electrically connected to and is controlled by the power generation controlling device 7.

The fuel supplying device 6 includes a fuel reservoir 6a, a fuel delivering device 6b, and a fuel pipe 6c. The fuel supplying device 6 supplies fuel to the anode 3b of the unit fuel cell 3 included in the fuel cell stack 2.

As the fuel reservoir 6a, a container capable of storing fuel can be used without particular limitation, and for example, a fuel tank housing an aqueous methanol solution or methanol can be used. In addition, in cases such as using the fuel cell system 1 as a stationary power source for household use, fuel from outside may be directly supplied to the fuel cell system 1, without using the fuel reservoir 6a.

The fuel delivering device 6b supplies fuel stored in the fuel reservoir 6a to the anode 3b via the fuel pipe 6c. As the fuel delivering device 6b, for example, a flow rate controller, a fuel valve, a fuel pump, and the like can be used.

The fuel delivering device 6b is electrically connected to and is controlled by the power generation controlling device 7.

In the case where the fuel supplying device 6 functions as the water supplying device, a 0.5 to 6 mol/L aqueous methanol solution is preferably used as fuel.

The power generation controlling device 7 not only controls power generation by the fuel cell stack 2, but also controls the heating device 4 and the fuel cell stack cooling device 8 so that heating and cooling of moisture supplied to the fuel cell stack 2 are repeated. That is, the power generation controlling device 7 also functions as a device for controlling the heating device 4 and the fuel cell stack cooling device 8, so that heating and cooling of moisture supplied to the fuel cell stack 2 are repeated.

The power generation controlling device 7 can be constituted, for example, of a processing circuit realized by a microcomputer including a central processing unit (CPU) and a memory device, and the like. As the memory device, a device known in the art such as read-only memory (ROM), random access memory (RAM), hard disk drive (HDD), and flash memory can be used, for example. In the memory device, programs for executing various kinds of control, reference values for starting various kinds of control, and the like are input in advance.

A device for controlling the heating device 4 and the fuel cell stack cooling device 8 so that heating and cooling of moisture supplied to the fuel cell stack 2 are repeated, may be provided separately from the power generation controlling device 7. In this case also, the device for controlling the heating device 4 and the fuel cell stack cooling device 8 can be constituted of a processing circuit realized by a microcomputer including a central processing unit (CPU) and a memory device, and the like.

The heating device 4 is provided at the outer periphery of the fuel cell stack 2. As the heating device 4, for example, a heater such as a rubber heater can be used.

The temperature of the fuel cell stack 2 is measured with, for example, a thermocouple, and the heating device 4 is controlled by the power generation controlling device 7 based on the measured temperature, to make the temperature of the fuel cell stack 2 be a predetermined temperature.

The heating device 4 may be provided inside the fuel cell stack 2.

The fuel cell stack cooling device 8 may cool the fuel cell stack 2 by delivering air to the outer periphery portion thereof. Alternatively, a fuel cell stack 2 may be cooled, by providing a cooling channel on the separator and delivering air thereto by the fuel cell stack cooling device 8. As the fuel cell stack cooling device 8, for example, an air blowing device such as a blower and a fan can be used.

As with the case of the heating device 4, the fuel cell stack cooling device 8 is controlled by the power generation controlling device 7 based on the measured temperature of the fuel cell stack 2, to make the temperature of the fuel cell stack 2 be a predetermined temperature.

In the following, the operation of the fuel cell system according to the present embodiment will be explained.

First, the detecting device 9 detects whether or not there is lack of humidification in the fuel cell stack 2 included in the fuel cell system 1. The detecting device 9 can include, for example: a measuring device 9a for measuring the output power or the internal resistance of the fuel cell stack 2, or the hibernation time of the fuel cell stack 2; and a determining device 9b for determining lack of humidification in the fuel cell stack 2, based on information from the measuring device 9a. The determining device 9b, like the power generation controlling device 7, can be constituted of a processing circuit realized by a microcomputer including a central processing unit and a memory device, and the like. The power generation controlling device 7 may also serve as the determining device 9b.

The measuring device 9a is electrically connected to the determining device 9b, and information from the measuring device 9a is delivered to the determining device 9b. The determining device 9b is electrically connected to the power generation controlling device 7.

When a command to start power generation is entered in the power generation controlling device 7 (when the fuel cell system 1 is activated), the determining device 9b is prompted by a signal from the power generation controlling device 7 to determine whether or not there is lack of humidification in the fuel cell stack 2 based on information from the measuring device 9a. Specifically, the fuel cell stack 2 is determined as in a state of lacking humidification, in the case where information values delivered from the measuring device 9a to the determining device 9b are not within the predetermined range stored as memory in the determining device 9b. In the case where the determining device 9b determines that the fuel cell stack 2 lacks humidification, the fuel cell stack 2 is humidified by the power generation controlling device 7 based on information from the determining device 9b.

In the case of measuring the output power of the fuel cell stack 2, a device known in the art capable of measuring output power can be used as the measuring device 9a.

In the case of measuring the internal resistance of the fuel cell stack 2, a device known in the art capable of measuring internal resistance can be used as the measuring device 9a. As such a device, an AC impedance measuring device can be used for example.

In the case of measuring the hibernation time of the fuel cell stack 2, as a measuring device 9a, a device capable of storing memory of the time from the start of hibernation of the fuel cell stack 2 can be used without particular limitation.

In the case where the measuring device 9a measures the output power of the fuel cell stack 2, the fuel cell stack 2 is humidified when the measured output power value is lower than the predetermined output power value.

In the case where the measuring device 9a measures the internal resistance value of the fuel cell stack 2, the fuel cell stack 2 is humidified when the measured internal resistance value is higher than the predetermined internal resistance value.

In the case where the measuring device 9a measures the hibernation time of the fuel cell stack 2, the fuel cell stack 2 is humidified when the measured hibernation time is longer than the predetermined hibernation time.

In the case where the measuring device 9a measures the output power of the fuel cell stack 2, the fuel cell stack 2 is first activated by the power generation controlling device 7, and then the output power is measured. In the case where the fuel cell stack 2 needs to be humidified, power generation is once stopped, and started again after the fuel cell stack 2 is humidified. Since power generation for measuring the output power of the fuel cell stack 2 is conducted only for a short period of time, there is hardly any occurrence of degradation of the electrode due to power generation conducted when the fuel cell stack 2 is in a state of lacking humidification.

The range of predetermined information values used for determining whether or not there is lack of humidification, that is, the range of the output power value, the internal resistance value, or the hibernation time, differs according to: the structure and material of the unit fuel cell 3; the size and form of the fuel cell stack 2; the configuration and form of the fuel cell system 1; the state in which power generation is controlled; and the like. As one guideline for example, it is preferable to humidify the fuel cell stack 2 in the case of: the output power thereof declining to half or less of the value averaged out for the output power thereof at activation several times in the past; the internal resistance thereof rising to twice or more of the value averaged out for the internal resistance thereof at activation several times in the past; or the hibernation time thereof being longer than one month.

In the case where the fuel cell stack 2 is determined as lacking humidification by the detecting device 9, humidification is conducted therefor. For example, the fuel cell stack 2 is humidified as follows. First, the signal from the power generation controlling device 7 prompts the water supplying device (fuel supplying device 6) to supply moisture to the fuel cell stack 2. Then, the signal from the power generation controlling device 7 prompts the heating device 4 to heat the moisture supplied to the fuel cell stack 2, and the fuel cell stack cooling device 8 to cool the heated moisture. The power generation controlling device 7 controls the heating device 4 and the fuel cell stack cooling device 8 so that heating and cooling are repeated. In the above manner, the fuel cell stack 2 is humidified.

In the fuel cell system 1 of the present embodiment, moisture may be supplied only to the anode 3b of the unit fuel cell 3 by the fuel supplying device 6. Alternatively, an additional water supplying device may be provided to supply moisture to each of the anode 3b and the cathode 3a. Further alternatively, a different water supplying device may be provided to supply moisture only to the cathode 3a, without using the fuel supplying device 6 as the water supplying device. In the case where an additional water supplying device or a different water supplying device is provided: such water supplying device can be constituted of a water reservoir, a water delivering device, and a water pipe as mentioned below in Embodiment 2; and water (such as ion-exchanged water) or a 0.1 to 2 mol/L aqueous alcohol solution may be used for moisture.

That is, the water supplying device supplies moisture to at least one of the cathode 3a and the anode 3b of the unit fuel cell 3 included in the fuel cell stack 2.

The moisture supplied to the fuel cell stack 2 (that is, the unit fuel cell 3) is heated by the heating device 4, and the heated moisture is cooled by the fuel cell stack cooling device 8. By repeating heating and cooling of the supplied moisture, the fuel cell stack 2 can be quickly moistened.

Studies are currently being concentrated on the specific cause of the quick progression of humidification in the unit fuel cell 3 in the case where heating and cooling are repeated rather in the case where a heated state is maintained, and the cause is considered to be as follows. It is considered that most of the supplied moisture vaporizes inside the unit fuel cell 3 in a heated state, and that the vaporized moisture quickly diffuses throughout the entire unit fuel cell 3. Next, when the vaporized moisture is cooled, condensation occurs, followed by occurrence and growth of droplets. That is, it is considered that droplets occur throughout the entire unit fuel cell 3, and thus, moisture permeates throughout the entire unit fuel cell 3. As the above, it is considered that the unit fuel cell 3 is quickly moistened since moisture can be diffused inside the unit fuel cell 3, even at areas where liquid diffusion is considered to be difficult.

Further, in the fuel cell system 1 of the present embodiment, it is preferable that the moisture supplied to the fuel cell stack 2 is heated near to the operating temperature of the fuel cell stack 2 and the heated moisture is cooled near to room temperature. Specifically, the temperature achieved for the fuel cell stack 2 when heated (that is, the temperature of the heated moisture) is preferably about 50° C. to 80° C. which is near operating temperature of the fuel cell stack 2. The temperature achieved for the fuel cell stack 2 when cooled after being heated (the temperature of the cooled moisture) is preferably 15° C. to 35° C. which is near room temperature. The higher the temperature achieved when heated, the easier it becomes for moisture to diffuse inside the unit fuel cell 3 after vaporizing. However, if heated to a temperature higher than 80° C., measures against high temperatures would become necessary. In addition, the greater the difference in temperature between heating and cooling, the quicker it becomes for humidification to progress. However, a substantial amount of time is required to cool to a temperature lower than 15° C.

Although the number of times heating and cooling are repeated differs depending on the structure and material of the unit fuel cell 3, 3 to 10 times is preferable for example.

As the above, since the fuel cell stack can be humidified by heating to a temperature about the same as normal operating temperature, there is no need to carry out special measures on the fuel cell system against high temperatures.

The above also applies to embodiments mentioned below.

The humidification time required until humidification is completed for the fuel cell stack 2 in a state of lacking humidification, differs according to: the structure and material of the unit fuel cell 3; the size and form of the fuel cell stack 2; the configuration and form of the fuel cell system 1; the state in which power generation is controlled; and the like. As one guideline for example, humidification time can be made 30 minutes or shorter. The fuel cell stack 2 is humidified during the period from when the fuel cell system 1 receives a command for starting power generation, until when actually starting power generation. Since the power required during this period is provided by a storage battery set combinedly in the fuel cell system 1 or an AC power source, humidification can not be continued for a long period of time. Therefore, the humidification time for the fuel cell stack 2 is preferably 30 minutes or shorter, and more preferably 15 minutes or shorter. The fuel cell stack 2 can be humidified in a short period of time, by making the respective temperatures achieved when heating and cooling the fuel cell stack 2 be within the respective ranges mentioned above, and further, by appropriately controlling the rate at which moisture is supplied as well as the respective rates at which the fuel cell stack 2 is heated and cooled.

It would be satisfactory if the fuel cell stack 2 is at least found to be in a state of lacking humidification, by the detecting device 9. Specifically, it would be satisfactory if the output power or the internal resistance of the fuel cell stack 2, or the hibernation time of the fuel cell stack 2 is made evident. For example, the detecting device 9 may include only the measuring device 9a, and moisture may be manually supplied from the water supplying device to the fuel cell stack 2, based on information from the measuring device 9a. The above also applies to Embodiment 2 mentioned below.

The respective temperatures achieved for the fuel cell stack 2 by the heating device 4 and the fuel cell stacking cooling device 8 can be controlled by using a temperature controlling device for: adjusting the temperature of the supplied moisture near to operating temperature of the fuel cell stack 2, by heating by the heating device 4; and adjusting the temperature of the supplied moisture near to room temperature, by cooling by the fuel cell stack cooling device 8. In the present embodiment, the power generation controlling device 7 also functions as the temperature controlling device. The temperature controlling device may be provided separately from the power generation controlling device 7. In such a case, the temperature controlling device can be constituted of a processing circuit realized by a microcomputer including a central processing unit and a memory device, and the like.

In the case where the output power or the internal resistance of the fuel cell stack 2 is measured by the measuring device 9a, humidification thereof may be ended: when the output power thereof becomes the predetermined value or more; or when the internal resistance thereof becomes the predetermined value or less. At this time, the respective measurements of the output power and the internal resistance are preferably conducted at predetermined time intervals.

A fuel cell system is normally assumed to be activated at least about once a week in most applications as a power source. It can be said that humidification of a unit fuel cell in such state of use is enabled by normal operation, and thus seldom conducted separately, regardless of the form and the like of the fuel cell stack. That is, a unit fuel cell used with frequency such as the above would rarely be in a state of lacking humidification, and thus, there would rarely be any drastic decline in the output power or drastic rise in the internal resistance therein. It can be said that humidification is needed in a unit fuel cell included in a fuel cell system, in the case of a hibernation time longer than that when operated in a manner such as the above.

In the present embodiment, power for driving the water supplying device, the heating device 4, and the fuel cell stack cooling device 8 is, for example, supplied from the storage battery set combinedly in the fuel cell system 1. Since humidification of the unit fuel cell stack 2 can be conducted quickly in the fuel cell system 1 of the present invention, load can be made lighter for the storage battery, and there would be no decline in long life characteristics and power generation efficiency for the system seen as a whole.

In the fuel cell system 1 of the present embodiment, power generated by the fuel cell stack 2 is supplied to an external load 10 via the power generation controlling device 7.

(Embodiment 2)

Figure 2:
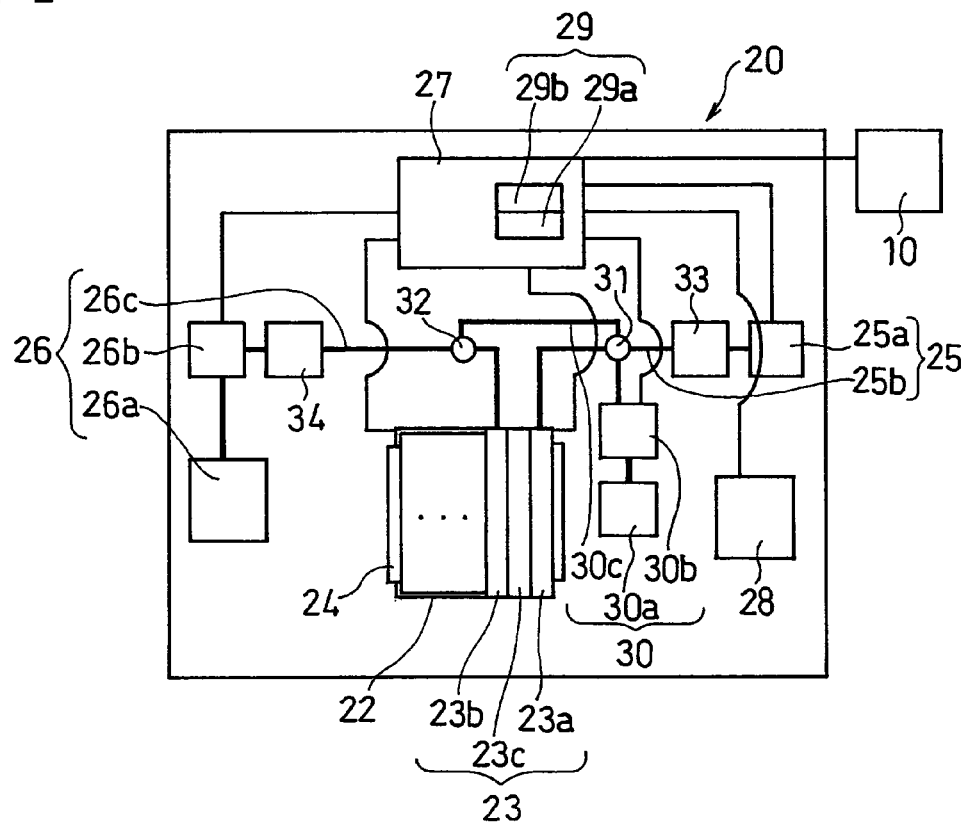
FIG. 2 is a block diagram schematically illustrating the configuration of a fuel cell system according to another embodiment of the present invention.

FIG. 2 illustrates a block diagram of a fuel cell system according to another embodiment of the present invention. A fuel cell system 20 in FIG. 2 includes a fuel cell stack 22, a fuel cell stack heating device 24, an oxidant supplying device 25, a fuel supplying device 26, and a power generation controlling device 27, which are common components in a fuel cell system with hydrogen gas as fuel. As with Embodiment 1, the fuel cell stack 22 includes at least one unit fuel cell 23. The unit fuel cell 23 includes a cathode 23a, an anode 23b, and a polymer electrolyte membrane 23c interposed therebetween. In FIG. 2 also, only one of the unit fuel cell 23 included in the fuel cell stack 22 is illustrated.

The fuel cell system 20 in FIG. 2 further includes a cooling device 28, a detecting device 29 for detecting lack of humidification in the fuel cell stack 22, and a water supplying device 30. The cooling device 28 cools moisture supplied to the fuel cell stack 22. The detecting device 29 includes a measuring device 29a and a determining device 29b for detecting whether or not there is lack of humidification in the fuel cell stack 22. As with Embodiment 1, the measuring device 29a measures the output power or the internal resistance of the fuel cell stack 22, or the hibernation time of the fuel cell stack 22.

In the present embodiment, the fuel cell stack heating device 24 also functions as a heating device for heating moisture supplied to the fuel cell stack 22.

Basically, the fuel cell stack 22, the fuel stack heating device 24, the oxidant supplying device 25, the power generation controlling device 27, the cooling device 28, the measuring device 29a, and the determining device 29b similar to those in Embodiment 1 can be used. In the present embodiment also, the power generation controlling device 27 may function as the determining device 29b. In addition, the detecting device 29 may only include the measuring device 9a.

The oxidant supplying device 25 includes an oxidant delivering device 25a and an oxidant pipe 25b. The oxidant delivering device 25 supplies an oxidant such as air to the cathode 23a of the unit fuel cell 23. The oxidant delivering device 25a may be provided with a humidifier 33. As the oxidant delivering device 25a, a device similar to that in Embodiment 1 can be used.

The fuel supplying device 26 includes a fuel reservoir 26a, a fuel delivering device 26b, and a fuel pipe 26c. The fuel supplying device 26 supplies a fuel gas such as hydrogen gas to the anode 23b of the unit fuel cell 23. The fuel delivering device 26b may be provided with a humidifier 34.

As the fuel reservoir 26a, a container capable of storing a fuel gas can be used without particular limitation, such as a fuel cylinder and a fuel tank, for example.

As the fuel delivering device 26b, a device capable of delivering a fuel gas can be used without particular limitation, such as a gas flow rate controller, a valve, and a pump, for example.

The fuel supplying device 26 may include a fuel reforming device (not illustrated).

The water supplying device 30 supplies moisture to at least one of the cathode 23a and the anode 23b of the unit fuel cell 23. As moisture supplied to the unit fuel cell 23, ion-exchanged water, a low concentration aqueous alcohol solution, and the like can be used.

In the fuel cell system 20 in FIG. 2, the water supplying device 30 includes a water reservoir 30a, a water delivering device 30b, and a water pipe 30c. As the water reservoir 30a, a container capable of storing ion-exchanged water or a low concentration aqueous alcohol solution can be used without particular limitation. The water delivering device 30b supplies moisture stored in the water reservoir 30a, via the water pipe 30c. As the water delivering device 30b, a flow rate controller, a valve, a pump, and the like can be used, for example. The water delivering device 30b is electrically connected to and controlled by the power generation controlling device 27.

The water pipe 30c is connected to the oxidant pipe 25b via a switching valve 31, and to the fuel pipe 26c via a switching valve 32. If the water pipe 30c is communicated to the oxidant pipe 25b by operating the switching valve 31, moisture can be supplied to the cathode 23a. Likewise, if the water pipe 30c is communicated to the fuel pipe 26c by operating the switching valve 32, moisture can be supplied to the anode 23b.

Moisture may be supplied to either one of, or both of the cathode 23a and the anode 23b.

The switching valves 31 and 32 may be operated automatically by the power generation controlling device 27, or may be operated manually.

In the fuel cell system 20 in FIG. 2 also, a method for humidifying the fuel cell stack 22 is the same as in Embodiment 1. Specifically, after the fuel cell system 20 is activated, the determining device 29b determines whether or not there is lack of humidification in the fuel cell stack, based on information from the measuring device 29a. When the determining device 29b determines that the fuel cell stack 22 needs to be humidified, the determining device 29b sends a signal to the power generation controlling device 27. Then, the signal from the power generation controlling device 27 prompts the water supplying device 30 to supply moisture to the fuel cell stack 22 (that is, the unit fuel cell 23). Then, the signal from the power generation controlling device 27 prompts the fuel cell stack heating device 24 to heat the moisture supplied to the fuel cell stack 22, and the cooling device 28 to cool the heated moisture. The power generation controlling device 27 controls the fuel cell stack heating device 24 and the cooling device 28 so that heating and cooling are repeated. In the above manner, the fuel cell stack 22 is humidified.

(Embodiment 3)

A method for humidifying a fuel cell stack (a unit fuel cell) of the present invention includes the steps of:

(a) supplying moisture to a fuel cell stack; and (b) humidifying the fuel cell stack by repeating heating and cooling of the supplied moisture.

The method for humidifying may include a step of determining whether or not there is lack of humidification in the fuel cell stack, before the step (a).

In a process for producing a fuel cell system with a common configuration, the method for humidifying is effective also in humidifying a fuel cell stack immediately after production. Generally, a unit fuel cell or a fuel cell stack is produced in a drier state than at normal operation, and then humidified afterwards. In the step of this humidification, quick humidification of the unit fuel cell or the fuel cell stack is possible by supplying moisture thereto and then repeating heating and cooling of the supplied moisture. Since only the unit fuel cell or the fuel cell stack needs to be handled regardless of the final configuration of the fuel cell system, the humidification method of the present invention is applicable to a production of a fuel cell system with a conventional configuration. Due to the above, time required for producing a fuel cell system can be shortened.

Specifically, a method for producing a fuel cell stack of the present invention includes the steps of:

(i) producing a fuel cell stack including at least one unit fuel cell including a cathode, an anode, and a polymer electrolyte membrane interposed therebetween;

(ii) supplying moisture to the fuel cell stack; and (iii) humidifying the fuel cell stack by repeating heating and cooling of the supplied moisture.

Due to the same reason as the above, it is preferable that in the step (iii), the moisture is heated near to the operating temperature of the fuel cell stack and the heated moisture is cooled near to room temperature.

As explained in Embodiments 1 and 2, the fuel cell system of the present invention may be a direct methanol fuel cell system, or a fuel cell system in which hydrogen gas is used as fuel. In the case of a fuel cell system in which hydrogen gas is used as fuel, the fuel cell stack can be humidified by further providing a water supplying device and a cooling device to a conventional fuel cell system. In the case of a direct methanol fuel cell system, the fuel cell stack can be humidified by further providing a heating device to a conventional fuel cell system.

As the above, since additional large-scale installation is unnecessary, the fuel cell system can be made smaller and/or simpler.

The fuel cell system of the present invention is preferably a direct methanol fuel cell system. In the case of a direct methanol fuel cell system in which an aqueous methanol solution is used as fuel, an aqueous methanol solution whose affinity with an electrode is higher compared to water can be used as moisture supplied to the fuel cell stack, without requiring a water supplying device to be provided separately. Further, as the heating device, a thin, lightweight rubber heater and the like can be used, for example.

A direct methanol fuel cell system can be used mainly as the power source for mobile devices. A solid polymer fuel cell in which hydrogen gas is used as fuel can be used, not only as a stationary power source, but also as a power source for cars and the like.

As the above, according to the fuel cell system of the present invention, a fuel cell stack (a unit fuel cell) lacking humidification can be quickly humidified without conducting power generation which is likely to cause degradation in the fuel cell stack. Further, there is no need to supply for humidification, a weakly acidic aqueous solution or a high concentration aqueous alkaline solution which is likely to cause degradation in the fuel cell stack. Due to the above, degradation of the fuel cell stack caused due to supplying a weakly acidic aqueous solution or a high concentration aqueous alkaline solution can be suppressed.

Therefore, in the fuel cell system of the present invention, since a fuel cell stack can be quickly humidified even if having been in a state of lacking humidification, an output power equal to that when a fuel cell stack is in a normal state (humidified state) can be achieved in a short period of time. Further, in the fuel cell system of the present invention, degradation of the fuel cell stack is suppressed, even in a situation where humidification is repeated. As a result, life characteristics of the fuel cell stack can be improved.

EXAMPLES

In the following, the present invention will be explained with reference to examples. However, it should be noted that the present invention is not limited to the following examples.

Example 1

[Production of Catalyst Layer]

A catalyst ink was prepared by mixing: 6 ml of dispersion made of an aqueous isopropanol solution with a cathode catalyst dispersed therein; and 5 ml of a polymer electrolyte dispersion (a 5 wt % Nafion® solution, manufactured by Sigma-Aldrich Japan K.K.). This catalyst ink was applied onto a polytetrafluoroethylene (PTFE) sheet and then dried to produce a cathode catalyst layer. A Pt catalyst was used as the cathode catalyst. The Pt catalyst was carried on ketjen black (manufactured by Ketjen Black International Co., Ltd., under the trade name of ECP). The amount of the Pt catalyst relative to the total of the Pt catalyst and ketjen black was 50 wt %.

An anode catalyst layer was produced in the same manner as the cathode catalyst layer, except for using an anode catalyst in place of the cathode catalyst. A Pt—Ru catalyst (atomic ratio of Pt:Ru=1:1) was used as the anode catalyst. The Pt—Ru catalyst was carried on ketjen black (ECP). The amount of the Pt—Ru catalyst relative to the total of the Pt—Ru catalyst and ketjen black was 50 wt %.

[Production of Gas Diffusion Layer]

A gas diffusion layer ink was prepared by mixing: acetylene black (manufactured by Denki Kagaku Kogyo K.K., under the trade name of Denka Black); a PTFE dispersion (manufactured by Sigma-Aldrich Japan K.K., with a solid content of 60 wt %); and a predetermined amount of ion-exchanged water. This ink was applied to one face of a carbon paper (manufactured by Ballard Material Products, Inc., under the trade name of AvCarb® 1071HCB) and then dried to obtain a cathode gas diffusion layer.

An anode gas diffusion layer was produced in the same manner as the cathode gas diffusion layer, except for using a different carbon paper (manufactured by Toray Industries, Inc., under the trade name of TGP-H-090).

[Production of MEA and Unit Fuel Cell]

The cathode catalyst layer was stacked on one face of a polymer electrolyte membrane (manufactured by E.I. du Pont de Nemours and Company, under the trade name of Nafion® 112), and the anode catalyst layer was stacked on the other face thereof. The obtained stacked body was hot-pressed, and then the PTFE sheet was peeled off to transfer the cathode catalyst layer and the anode catalyst layer to the polymer electrolyte membrane.

Next, the cathode gas diffusion layer was stacked on the cathode catalyst layer, and the anode gas diffusion layer was stacked on the anode catalyst layer. By hot-pressing, the diffusion layers were bonded to the catalyst layers, respectively.

In the above manner, an MEA was produced.

In the obtained MEA, a rubber gasket was attached to the part on each face of the polymer electrolyte membrane where an electrode (catalyst layer+gas diffusion layer) was not bonded. Then, in a manner sandwiching the MEA, a pair each of: separators made of graphite; current collector plates; rubber heaters as a heating device; insulating plates; and end plates were stacked in this order. Then, a thermocouple was attached to the part of the separator. In the above manner, a unit fuel cell was produced.

By using the obtained unit fuel cell, a fuel cell system as illustrated in FIG. 1 was produced.

Specifically: an air supplying device; a fuel supplying device serving also as a water supplying device; a cooling device; a power generation controlling device; and an internal resistance measuring device serving as a detecting device for detecting lack of humidification in the unit fuel cell were attached to the obtained unit fuel cell.

An air pump was used as an oxidant delivering device.

A 1 mol/L aqueous methanol solution was used as fuel; a fuel tank was used as a fuel reservoir; and a fuel pump was used as a fuel delivering device.

An air-blowing fan was used as a cooling device, and enabled air to flow to the outer periphery of the unit fuel cell.

An electronic load device was used as a power generation controlling device and an external load for consuming power generated by the fuel cell system.

An AC impedance measuring device was used as an internal resistance measuring device.

[Evaluation]

The obtained fuel cell system was subjected to preliminary power generation at 60° C. at a constant current of 100 mA/cm$^2$, and the output power and the internal resistance were stabilized. Then, the following evaluation test was performed for humidification.

A unit fuel cell was made to be in a state of lacking humidification by drying the inside of the unit fuel cell, by maintaining the temperature of the unit fuel cell in a hibernating state to 60° C. and introducing nitrogen into the respective supply ports for air and fuel. In the present example, a unit fuel cell was regarded as being in a state of lacking humidification, when the internal resistance value measured by the internal resistance measuring device while drying the inside of the unit fuel cell, became twice the resistance value at the start of introducing nitrogen (a first resistance value).

Next, an aqueous methanol solution was supplied as moisture to the anode of the unit fuel cell in a state of lacking humidification, and the unit fuel cell was heated to be 60° C. in about 1 minute by using the rubber heater. Then, the unit fuel cell was cooled to be 30° C. in about 2 minutes by the cooling device. This heating and cooling were repeated, and while repeated, measurements were made for the internal resistance values of the unit fuel cell at 60° C. The time that was required for the measured internal resistance value to decline to a value within the range of (the first internal resistance value) to (a value 5% greater than the first internal resistance value) (humidification time) was obtained. The obtained results are shown in Table 1. The supplying of the aqueous methanol solution, the heating by the rubber heater, and the cooling by the cooling device were done manually.

Next, continuous power generation was conducted in the humidified unit fuel cell by an electronic load device at a constant current of 150 mA/cm$^2$ for 60 minutes. For this power generation, the temperature of the unit fuel cell was maintained at 60° C., the air utilization rate was 50%, and the fuel utilization rate was 70%. By designating continuous power generation conducted as such as 1 cycle, a 100-cycle power generation test was performed. The rate of the average voltage at the $1^{st}$ cycle to the average voltage at the $100^{th}$ cycle was referred to as the voltage retention rate. The obtained results are shown in Table 1. In Table 1, voltage retention rates are expressed in percentage values.

Example 2

A fuel cell system of Example 2 was produced in the same manner as Example 1, except for providing a second water supplying device for supplying moisture to the cathode. Specifically, a water pipe, a water delivering device (a pump), and a water reservoir (a tank) were connected to an oxidant pipe, via a switching valve. Ion-exchanged water was used as moisture supplied to the cathode.

An evaluation test was performed on the fuel cell system of Example 2 in the same manner as Example 1.

Example 3

A fuel cell system of Example 3 was produced in the same manner as Example 1, except for providing a first water supplying device for supplying moisture to the cathode and the anode, without using a fuel supplying device as a water supplying device. Specifically, a water delivering device (a pump) was connected to a water reservoir (a tank), and water pipes extending from the water delivering device were connected via a first switching valve and a second switching valve, to an oxidant pipe and a fuel pipe, respectively.

In the fuel cell system of Example 3, moisture was supplied to each of the cathode and the anode. In the present example, ion-exchanged water was used as moisture.

An evaluation test was performed on the fuel cell system of Example 3 in the same manner as Example 1. The results are shown in Table 1.

Example 4

A fuel cell system as illustrated in FIG. 2 was produced by using the unit fuel cell produced in Example 1. The obtained fuel cell system was designated as the fuel cell system of Example 4.

Specifically, an air supplying device, a fuel supplying device, a cooling device, a water supplying device, a power generation controlling device, and an internal resistance measuring device were attached to the unit fuel cell that was produced.

An air pump was used as an air delivering device. A humidifier was attached to an air pipe to humidify air.

Hydrogen gas was used as fuel. A gas cylinder was used as a fuel reservoir, and a flow rate controller was used as a fuel delivering device. A humidifier was attached to a fuel pipe to humidify hydrogen gas.

An air-blowing fan was used as the cooling device, enabling air to flow to the outer periphery of the unit fuel cell.

A pump was used as a water delivering device.

An electronic load device was used as a power generation controlling device and an external load for consuming power generated by the fuel cell system.

An AC impedance measuring device was used as the internal resistance measuring device.

In the fuel cell system of Example 4, moisture was supplied to each of the cathode and the anode. In the present example, ion-exchanged water was used as moisture.

An evaluation test was performed on the fuel cell system of Example 4 in the same manner as Example 1. The results are shown in Table 1.

Comparative Example 1

An evaluation test was performed in the same manner as Example 1 using the fuel cell system of Example 1, except for: excluding the repetition of heating and cooling; and conducting power generation at a constant current of 150 mA/cm$^2$ at 60° C. The results are shown in Table 1.

Comparative Example 2

An evaluation test was performed in the same manner as Example 1 using the fuel cell system of Example 1, except for: excluding the repetition of heating and cooling; and maintaining the temperature of the unit fuel cell at 60° C. The results are shown in Table 1.

Comparative Example 3

An evaluation test was performed in the same manner as Example 1 using the fuel cell system of Example 2, except for: excluding the repetition of heating and cooling; and maintaining the temperature of the unit fuel cell at 60° C. The results are shown in Table 1. In the present comparative example, methanol was supplied to the cathode of the unit fuel cell, in place of ion-exchanged water.

Comparative Example 4

An evaluation test was performed in the same manner as Example 1 using the fuel cell system of Example 4, except for: excluding the repetition of heating and cooling; and conducting power generation at a constant current of 150 mA/cm$^2$ at 60° C. The results are shown in Table 1.

Fuel and the humidification method used in each fuel cell system are also shown in Table 1. Here, as the humidification method, type of moisture supplied to the cathode and/or the anode and the operation conducted for humidification are shown.

TABLE 1

| | Fuel | Humidification Method | | | Humidification Time | Voltage Retention Rate |
| | | Cathode | Anode | Operation | | |
|---|---|---|---|---|---|---|
| Ex. 1 | Aqueous Methanol Solution | — | Aqueous Methanol Solution | Repetition of Heating and Cooling | 10 min. | 95% |
| Ex. 2 | | Ion-exchanged Water | | | 10 min. | 94% |
| Ex. 3 | | | Ion-exchanged Water | | 13 min. | 96% |
| Ex. 4 | Hydrogen Gas | | | | 13 min. | 97% |
| Comp. Ex. 1 | Aqueous Methanol Solution | — | Aqueous Methanol Solution | Constant-Current Power Generation | 12 min. | 76% |
| Comp. Ex. 2 | | — | | Maintaining Temperature at 60° C. | 48 min. | 91% |
| Comp. Ex. 3 | | Methanol | Methanol | | 22 min. | 74% |
| Comp. Ex. 4 | Hydrogen Gas | Humidified Air | Humidified Hydrogen Gas | Constant-Current Power Generation | 14 min. | 81% |

In Comparative Examples 1 and 4 in which power generation was conducted to humidify the unit fuel cell, the humidification time is relatively short, but there is a drastic decline in the voltage retention rate (that is, life characteristics). This is considered to be due to degradation of the electrode material, the polymer electrolyte membrane, and the like caused by conducting power generation using a unit fuel cell lacking humidification.

In Comparative Example 2 in which humidification was conducted by only supplying moisture and without conducting power generation, it is evident that substantial time is required for humidification. From the above result, it is evident that substantial time would be required for moisture to diffuse to the inside of the electrode even if moisture is supplied to the unit fuel cell while a constant temperature is maintained therefor.

In Comparative Example 3 in which humidification was conducted by supplying methanol, the humidification time is relatively short, but life characteristics degrade drastically. This is considered to be due to degradation of the electrode material, the polymer electrolyte membrane, and the like, caused by introducing high concentration alcohol.

The fuel cell systems of the present invention used in Examples 1 to 4 exhibit shorter humidification time and favorable life characteristics. From the above results, it is evident that a unit fuel cell can be quickly humidified by the fuel cell system of the present invention, with hardly any degradation caused therein.

Particularly, in Examples 1 and 2 in which an aqueous methanol solution was used to humidify the anode, the humidification time is shorter than in the cases of Examples 3 and 4 in which ion-exchanged water was used to humidify the anode. This is considered to be due to using an aqueous methanol solution whose affinity with an electrode material is higher compared to ion-exchanged water.

Further, when a comparison is made between: the difference in voltage retention rate between Example 1 and Comparative Example 1; and the difference in voltage retention rate between Example 4 and Comparative Example 4, it is evident that Example 1 exhibits greater effect in suppressing degradation in life characteristics. In the case of a unit fuel cell using an aqueous methanol solution as fuel, it is considered that the cathode degrades drastically in particular if power generation is conducted when the unit fuel cell is in a state of lacking humidification, since air supplied to the cathode is not yet humidified. Therefore, it is evident that the present invention exhibits greater effect in the case of a fuel cell system using an aqueous methanol solution as fuel.

From the above results, it is evident that the present invention enables quick humidification of a unit fuel cell lacking humidification, and further enables a direct methanol fuel cell system and a solid polymer fuel cell system capable of suppressing degradation in life characteristics of a unit fuel cell caused by lack of humidification therein.

In the fuel cell system of the present invention, even in the case where lack of humidification is caused in a unit fuel cell (a fuel cell stack), quick humidification of the unit fuel cell is possible while suppressing degradation thereof. Due to the above, the fuel cell system of the present invention has excellent output characteristics and long life characteristics. Therefore, the fuel cell system of the present invention can be favorably used, for example, as the power source for household use, electric cars, and mobile devices such as laptop computers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A fuel cell system comprising:
   (A) a fuel cell stack comprising at least one unit fuel cell comprising a cathode, a anode, and a polymer electrolyte membrane interposed therebetween;
   (B) a detecting device for detecting lack of humidification in said fuel cell stack;
   (C) a water supplying device for supplying moisture to said fuel cell stack when lack of humidification is detected by said detecting device;
   (D) a heating device for heating said supplied moisture;
   (E) a cooling device for cooling said supplied moisture; and
   (F) a humidification control device programmed to control said heating device and said cooling device such that when said detecting device detects lack of humidification, a humidification process is repeated alternately, the humidification process comprising: heating of moisture in said fuel cell stack to a first predetermined temperature; and cooling of said moisture to a second predetermined temperature.

2. The fuel cell system in accordance with claim 1, wherein, in a case where hydrogen gas is supplied as fuel to said anode, said fuel cell system includes a fuel cell stack heating device for heating said fuel cell stack, and said fuel cell stack heating device functions as said heating device for heating said supplied moisture.

3. The fuel cell system in accordance with claim 1, wherein, in a case where an aqueous methanol solution is supplied as fuel to said anode, said fuel cell system includes a fuel supplying device for supplying said fuel to said anode and a fuel cell stack cooling device for cooling said unit fuel cell, and said fuel supplying device functions as said water supplying device and said fuel cell stack cooling device functions as said cooling device for cooling said supplied moisture.

4. The fuel cell system in accordance with claim 1, wherein said detecting device comprises:

(G) a measuring device for measuring an output power, an internal resistance, or a hibernation time, of said fuel cell stack; and (H) a determining device for determining whether or not there is the lack of humidification in said fuel cell stack, based on information obtained by said measuring device.

5. The fuel cell system in accordance with claim 4, wherein said humidification control device controls said heating device and said cooling device such that said humidification process is repeated until the output power of said fuel cell stack measured by said measuring device reaches a predetermined value or higher.

6. The fuel cell system in accordance with claim 4, wherein said humidification control device controls said heating device and said cooling device such that said humidification process is repeated until the internal resistance of said fuel cell stack measured by said measuring device reaches a predetermined value or higher.

7. The fuel cell system in accordance with claim 1, further comprising:

(I) a temperature controlling device for adjusting a temperature of said supplied moisture near to an operating temperature of said fuel cell stack by heating by said heating device; and adjusting the temperature of said supplied moisture near to room temperature by cooling by said cooling device.

8. The fuel cell system in accordance with claim 1, wherein said humidification control device controls said heating device and said cooling device such that said humidification process is carried out for a predetermined number of cycles.

9. The fuel cell system in accordance with claim 8, wherein said predetermined number of cycles is three to ten.

10. The fuel cell system in accordance with claim 1, wherein said first predetermined temperature is 50 to 80° C.

11. The fuel cell system in accordance with claim 1, wherein said second predetermined temperature is 15 to 35° C.

* * * * *